United States Patent [19]

Ito et al.

[11] Patent Number: 5,353,220
[45] Date of Patent: Oct. 4, 1994

[54] APPARATUS AND METHOD FOR DISPLAYING THREE-DIMENSIONAL IMAGE AND ULTRASONIC DIAGNOSIS APPARATUS USING THE SAME

[75] Inventors: Yukio Ito; Ken Ishikawa, both of Matsudo; Osamu Sasahara, Kashiwa; Yoshihiro Goto, Tokyo, all of Japan

[73] Assignee: Hitachi Medical Corporation, Tokyo, Japan

[21] Appl. No.: 34,577

[22] Filed: Mar. 19, 1993

[30] Foreign Application Priority Data

Mar. 19, 1992 [JP] Japan ................................. 4-092434

[51] Int. Cl.$^5$ ............................................. G06F 15/00
[52] U.S. Cl. ............................ 364/413.13; 364/413.25
[58] Field of Search ....................... 364/413.13, 413.25; 128/660.05, 661.07, 661.08, 661.09

[56] References Cited

U.S. PATENT DOCUMENTS 4,866,612  9/1989  Takagi et al. .................. 364/413.22
5,081,993  1/1992  Kitney et al. .................. 128/661.08

OTHER PUBLICATIONS

Ryoza Omoto, "Real Time Two-Dimensional Doppler Echocardiography" Dec. 9, 1983, pp. 6-13.
Ohi Co., "Television Information Engineering Handbook" pp. 18-28.

Primary Examiner—Roy N. Envall, Jr.
Assistant Examiner—Ari M. Bai
Attorney, Agent, or Firm—Antonelli, Terry, Stout & Kraus

[57] ABSTRACT

A plurality of Doppler image data corresponding to a plurality of sliced planes of an object which are different from one another, respectively, are received. The plurality of Doppler image data shows distributions of first and second moving directions and moving velocities of a moving substance in the object on the plurality of sliced planes, respectively. First and second data showing distribution corresponding to each of a plurality of velocity ranges of the moving velocities among the distribution of the first and second moving direction, respectively, of the moving substance on each of the sliced planes is obtained based on the Doppler image data. Each of first and second three-dimensional image data is obtained based on the data corresponding to each of the plurality of velocity ranges and also corresponding to all of the plurality of sliced planes among all of the first and second data, respectively. Third three-dimensional image data is obtained by synthesizing all of the first and second three-dimensional image data and data corresponding to respective first three-dimensional image data and second three-dimensional image data among the third three-dimensional image show tones of color different from one another with three-dimensional image data corresponding to the third three-dimensional image data being displayed.

18 Claims, 9 Drawing Sheets

APPARATUS AND METHOD FOR DISPLAYING THREE-DIMENSIONAL IMAGE AND ULTRASONIC DIAGNOSIS APPARATUS USING THE SAME

BACKGROUND OF THE INVENTION

The present invention relates to an apparatus and a method for displaying a three-dimensional image based on a plurality of Doppler image data and an ultrasonic diagnosis apparatus using the same.

An ultrasonic diagnosis apparatus for obtaining Doppler data and displaying a two-dimensional color Doppler image based on the Doppler image data has been heretofore offered. ("Real Time Two-Dimensional Doppler Echocardiography" pp. 6–13, edited and written by Ryozo Omoto, published on Dec. 9, 1983 by Diagnosis and Remedy Co., Ltd.)

First, the color Doppler image mentioned above will be described.

The color Doppler image is an image obtained by generating ultrasonic beams 2 from a probe toward a blood vessel 1 at a diagnosis region in an object to be examined as shown in FIG. 7A, receiving a reflected echo from the blood vessel 1 so as to detect a Doppler signal, and displaying an image after appropriate coloration in accordance with information contained in the Doppler signal.

In the color Doppler image, a flow such as a blood flow moving on toward the ultrasonic beam generated by the probe is displayed in a warm color (R+G) obtained by mixing a red color (R) and a green color (G) with each other in an appropriate ratio, and a flow getting away from the ultrasonic beam generated by the probe is displayed in a cold color (B+G) obtained by mixing a blue color (B) and a green color (G) with each other in an appropriate ratio, and the faster flow is shown as the display gets brighter. Further, the green color (G) is controlled by the variance of the blood flow velocity, and display is made by increasing the green color (G) as the variance gets larger.

With this, a blood flow having large variance which moves on toward the ultrasonic beam generated by the probe is displayed in a yellow color, the blood flow having small velocity variance is displayed in a red color, and further, a blood flow having large velocity variance getting away from the ultrasonic beam generated by the probe is displayed in a bluish green color, and the blood flow having small velocity variance is displayed in a blue color.

The Doppler image data are composed of three data, i.e., data 5 for a red color (R), data 6 for a green color (G) and data 7 for a blue color (B) as shown in FIG. 8 for expressing the velocity information and the velocity variance information taking a case that the ultrasonic beams 2 are generated as shown in FIG. 7A on a blood flow shown with an arrow mark 3 containing a turbulent flow 4 therein as shown in FIG. 7 (b) as an example. Further, as shown in FIG. 8, a color Doppler image 8 is displayed by superposing these data after applying D/A conversion, respectively.

Further, in order to display a fast flow bright, the data for red color (R) and data for blue color (B) show higher brightness in respective colors as the value of the data gets bigger as shown in FIG. 10 so as to show a fast flow.

Similarly, the data for green color (G) show that the data having a larger value have larger variance in order to display the data having larger variance brighter.

Namely, the display of a color Doppler image is made by a method described in the next place when an RGB display system stipulated by Commission Internationale de Enluminure (CIE) is used.

As described in "Television Information Engineering Handbook" pp. 18–21, edited by The Institute of Television Engineers of Japan, published by Ohm Company, color stimulus [F] of a picture element may be defined by a color equation in equation (1) when looking at a displayed image in picture element unit. Here, it is assumed that [R], [G] and [B] show reference color stimuli and R, G and B show units thereof, and color stimulus [F] of a picture element is produced by mixing them with one another, thus forming a color picture image.

$$[F] = R[R] + G[G] + B[B] \tag{1}$$

Thus, a color Doppler image is displayed by assigning [R] as information showing the direction for expressing a blood flow moving on toward the ultrasonic beam generated by the probe and assigning R unit as information proportioned to the velocity thereof. Further, display is made by assigning [B] as information showing the direction and assigning B unit as information proportioned to the velocity thereof in order to express a blood flow getting away from the ultrasonic beam generated by the probe. Furthermore, display is made by assigning [G] as information showing variance and assigning G unit as information proportioned to the state of the variance in order to show the state of variance when there is velocity variance in respective blood flow described above. Then, a color Doppler image is formed by obtaining color stimuli [F] in picture element unit in accordance with the above-described method and synthesizing them.

As it may be realized from the above description, the data 5 for red color (R) show the distribution of moving velocity having a first moving direction (a direction of moving on toward the ultrasonic beam) of a moving substance such as blood in an object to be examined on a predetermined sliced plane of an object to be examined. Further, the data 7 for blue color (B) show the distribution of moving velocity having a second moving direction (a direction of getting away from the ultrasonic beam) of the moving substance in the object to be examined on the sliced plane. Further, the data 6 for green color (G) show the distribution of moving velocity variance of the moving substance in the object to be examined on the sliced plane.

Further, a method for displaying a color three-dimensional image using the Doppler image data described above has been heretofore proposed. This conventional method will be described with reference to FIG. 9. In FIG. 9, first, a plurality of Doppler image data 8 scanned at appropriate slice intervals with respect to a diagnosis region of an object to be examined are generated. Besides, a flow in a certain blood vessel is adopted as the object. Next, the respective color Doppler image data 8 are separated into data 9 of a red color (R) indicating a flow moving on toward the ultrasonic beam generated by the probe, data 10 of a blue color (B) indicating a flow getting away therefrom, and data 11 of a green color (G) indicating velocity variance of the stream. Next, profile points of the contoured images on respective sliced planes, e.g., points corresponding to positions of blood vessels are extracted after binarization by threshold processing for each of data 9, 10 and 11 in respective colors, and the extracted profile points are arranged on the respective sliced planes so as to reconstruct three-dimensional images 12, 13 and 14 in respective colors of red, blue and green by depth shading algorithm. Thereafter, a three-dimensional color Doppler image 15 has been displayed on a scope by superposing three-dimensional images 12, 13 and 14 in respective colors reconstructed as described above related to the distances from a certain predetermined visual point plane.

In such conventional three-dimensional color Doppler image display, however, the data 9 of a red color (R) and the data 10 of a blue color (B) showing a state of a flow of a blood flow, and the data 11 of a green color (G) showing velocity variance of a blood flow are processed with binarization by threshold processing when the three-dimensional images 12, 13 and 14 in respective colors shown in FIG. 9 are formed. Therefore, information on blood flow velocity and information on velocity variance have disappeared, and only information on directivity of a flow showing whether the flow is coming on toward the ultrasonic beam generated by the probe or the flow is getting away therefrom was obtainable or the information was converted into information only indicating whether there was velocity variance or not. Thus, it has been impossible to display information on the velocity of a blood flow and information on velocity variance which originally belong to a color Doppler image in an ultrasonic diagnosis apparatus having color Doppler instrumentation function with a three-dimensional image, thus being unable to display information effective for diagnosis.

SUMMARY OF THE INVENTION

It is an object of the present invention to provide an apparatus and a method for displaying a three-dimensional image and an ultrasonic diagnosis apparatus using the same capable of coping with such problems and displaying information on blood flow velocity and information on velocity variance with respect to a blood flow or the like in an organism which originally belong to a color Doppler image without losing such information.

In order to achieve such an object, according to one aspect of the present invention, an apparatus and a method for displaying a three-dimensional image based on a plurality of Doppler image data comprise: means for and steps of receiving the plurality of Doppler image data corresponding to a plurality of sliced planes of an object which are different from one another, respectively, the plurality of Doppler image data showing distributions of moving directions and moving velocities of a moving substance in the object on the plurality of sliced planes, respectively, and the moving directions including a first moving direction and a second moving direction; obtaining each of first data showing distribution corresponding to each of a plurality of velocity ranges of the moving velocities among the distribution of the first moving direction of the moving substance on each sliced plane based on each of Doppler image data; obtaining each of second data showing the distribution corresponding to each of the plurality of velocity ranges among the distribution of the second moving direction of the moving substance on each sliced plane based on each of the Doppler image data; obtaining each of first three-dimensional image data based on the data corresponding to each of the plurality of velocity ranges and also corresponding to all of the plurality of sliced planes among all of the first data; obtaining each of second three-dimensional image data based on the data corresponding to each of the plurality of velocity ranges and also corresponding to all of the plurality of sliced planes among all of the second data; obtaining third three-dimensional image data by synthesizing all of the first three-dimensional image data and all of the second three-dimensional image data with one another, the data corresponding to respective first three-dimensional image data and respective second three-dimensional image data among the third three-dimensional image data showing tones of color different from one another; and displaying the three-dimensional image corresponding to the third three-dimensional image data.

According to these apparatus and method for displaying an image, it is possible to display a three-dimensional Doppler image including velocity information on a blood flow or the like which originally belongs to the Doppler image data, thus making it possible to display information effective for diagnosis.

The data having different corresponding depths (visual points, visual point planes, distances from a light source or a light source plane) among the third three-dimensional data may show brightness different from one another.

According to another aspect of the present invention, an apparatus and a method for displaying a three-dimensional image based on a plurality of Doppler image data comprise means for and steps of receiving the plurality of Doppler image data corresponding to a plurality of sliced planes of an object which are different from one another, respectively, the plurality of Doppler image data showing distributions of moving velocity variances of a moving substance in the object on the plurality of sliced planes, respectively; means for obtaining each of first data showing distribution corresponding to each of a plurality of variance ranges of the moving velocity variances based on each of the Doppler image data; means for obtaining each of first three-dimensional image data based on the data corresponding to each of the plurality of variance ranges and also corresponding to all of the plurality of sliced planes among all of the first data; means for obtaining second three-dimensional image data by synthesizing all of the first three-dimensional image data, the data corresponding to respective first three-dimensional image data among the second three-dimensional image data showing tones of color different from one another; and means for displaying the three-dimensional image corresponding to the second three-dimensional image data.

According to these apparatus and method for displaying an image, it is possible to display a three-dimensional Doppler image including velocity variance information of a blood flow or the like which originally belongs to the Doppler image data, thus making it possible to display information effective for diagnosis.

The data having different corresponding depths among the second three-dimensional image data may show brightness different from one another.

According to still another aspect of the present invention, an apparatus and a method for displaying a three-dimensional image based on a plurality of Doppler image data comprise means for and steps of receiving the plurality of Doppler image data corresponding to a plurality of sliced planes of an object which are different from one another, the plurality of Doppler image data showing distributions of moving directions, moving velocities and moving velocity variances of a moving substance in the object on the plurality of sliced planes, respectively, and the moving directions including a first moving direction and a second moving direction; means for obtaining each of first data showing distribution corresponding to each of a plurality of velocity ranges of the moving velocities among the distribution of the first moving direction of the moving substance on each sliced plane; means for obtaining each of second data showing distribution corresponding to each of the plurality of velocity ranges among the distribution of the second moving direction of the moving substance on each sliced plane based on each of the Doppler image data; means for obtaining each of third data showing distribution corresponding to each of a plurality of variance ranges of the moving velocity variances based on each of the Doppler image data; means for obtaining each of first three-dimensional image data based on the data corresponding to each of the plurality of velocity ranges and also corresponding to all of the plurality of sliced planes among all of the first data; means for obtaining each of second three-dimensional image data based on the data corresponding to each of the plurality of velocity ranges and also corresponding to all of the plurality of sliced planes among all of the second data; means for obtaining each of third three-dimensional image data based on the data corresponding to each of the plurality of variance ranges and also corresponding to all of the plurality of sliced planes among all of the third data; means for obtaining fourth three-dimensional image data by synthesizing all of the first three-dimensional image data, all of the second three-dimensional image data and all of the third three-dimensional image data, the data corresponding to respective first three-dimensional image data and respective second three-dimensional image data among the fourth three-dimensional image data showing tones of color different from one another, and the data corresponding to respective third three-dimensional image data among the fourth three-dimensional image data showing tones of color different from one another; and means for displaying the third three-dimensional image corresponding to the fourth three-dimensional image data.

According to these apparatus and method for displaying an image, it is possible to display a three-dimensional Doppler image including velocity information on a blood flow or the like and velocity variance information on blood or the like which originally belong to the Doppler image data, thus making it possible to display information effective for diagnosis.

The data having different corresponding depths among the fourth three-dimensional image data may show brightness different from one another.

According to still another aspect of the present invention, an ultrasonic diagnosis apparatus for displaying a three-dimensional image based on a plurality of Doppler image data comprises a unit for obtaining the plurality of Doppler image data corresponding to a plurality of sliced planes of an object which are different from one another, respectively, the plurality of Doppler image data showing distribution of moving directions and moving velocities of a moving substance in the object on the plurality of sliced planes, respectively, and the moving directions including a first moving direction and a second moving direction; a unit for obtaining each of first data showing distribution corresponding to each of a plurality of velocity ranges of the moving velocities among distribution of the first moving direction of the moving substance on each sliced plane based on each of the Doppler image data; a unit for obtaining each of second data showing distribution corresponding to each of the plurality of velocity ranges among distribution of the second moving direction of the moving substance based on each of the Doppler image data; a unit for obtaining each of first three-dimensional image data based on the data corresponding to each of the plurality of velocity ranges and also corresponding to all of the plurality of sliced planes among all of the first data; a unit for obtaining each of second three-dimensional image data based on the data corresponding to each of the plurality of velocity ranges and also corresponding to all of the plurality of sliced planes among all of the second data; a unit for obtaining third three-dimensional image data by synthesizing all of the first three-dimensional image data and all of the second three-dimensional image data, the data corresponding to respective first three-dimensional image data and respective second three-dimensional image data among the third three-dimensional image data showing tones of color different from one another; and a unit for displaying the three-dimensional image corresponding to the third three-dimensional image data.

The data having different corresponding depths among the third three-dimensional image data may show brightness different from one another.

According to still another aspect of the present invention, an ultrasonic diagnosis apparatus for displaying a three-dimensional image based on a plurality of Doppler image data comprises a unit for obtaining the plurality of Doppler image data corresponding to a plurality of sliced planes of an object which are different from one another, respectively, the plurality of Doppler image data showing distributions of moving velocity variances of a moving substance in the object on the plurality of sliced planes, respectively; a unit for obtaining each of first data showing the distribution corresponding to each of a plurality of-variance ranges of the moving velocity variances based on each of the Doppler image data; a unit for obtaining each of first three-dimensional image data based on the data corresponding to each of the plurality of variance ranges and also corresponding to all of the plurality of sliced planes among all of the first data; a unit for obtaining second three-dimensional image data by synthesizing all of the first three-dimensional image data, the data corresponding to respective first three-dimensional image data among the second three-dimensional image data showing tones of color different from one another; and a unit for displaying the three-dimensional image corresponding to the second three-dimensional image data.

The data having different corresponding depths among the second three-dimensional data may show brightness different from one another.

According to still another aspect of the present invention, an ultrasonic diagnosis apparatus for displaying a three-dimensional image based on a plurality of Doppler image data comprises a unit for obtaining the plurality of Doppler image data corresponding to a plurality of sliced planes of an object which are different from one another, the plurality of Doppler image data showing distribution of moving directions, moving velocities and moving velocity variances of a moving substance in the object on the plurality of sliced planes, respectively, and the moving directions including a first moving direction and a second moving direction; a unit for obtaining each of first data showing the distribution corresponding to each of a plurality of velocity ranges of the moving velocities among the distribution of the first moving direction of the moving substance on each sliced plane; a unit for obtaining each of second data showing distribution corresponding to each of the plurality of velocity ranges among the distribution of the second moving direction of the moving substance on each sliced plane based on each of the Doppler image data; a unit for obtaining each of third data showing distribution corresponding to each of a plurality of variance ranges of the moving velocity variances based on each of the Doppler image data; a unit for obtaining each of first three-dimensional image data based on the data corresponding to each of the plurality of velocity ranges and also corresponding to all of the plurality of sliced planes among all of the first data; a unit for obtaining each of second three-dimensional image data based on the data corresponding to each of the plurality of velocity ranges and also corresponding to all of the plurality of sliced planes among all of the second data; a unit for obtaining each of third three-dimensional image data based on the data corresponding to each of the plurality of variance ranges and also corresponding to all of the plurality of sliced planes among all of the third data; a unit for obtaining fourth three-dimensional image data by synthesizing all of the first three-dimensional image data, all of the second three-dimensional image data and all of the third three-dimensional image data, the data corresponding to respective first three-dimensional image data and respective second three-dimensional image data among the fourth three-dimensional image data showing tones of color different from one another and the data corresponding to respective third three-dimensional image data among the fourth three-dimensional image data showing tones of color different from one another; and a unit for displaying the third three-dimensional image corresponding to the fourth three-dimensional image data.

The data having different corresponding depths among the fourth three-dimensional image data may show brightness different from one another.

DESCRIPTION OF THE PREFERRED EMBODIMENTS

An apparatus and a method for displaying a three-dimensional image and an ultrasonic diagnosis apparatus according to the present invention using the same will be described hereinafter with reference to the accompanying drawings.

Figure 1:
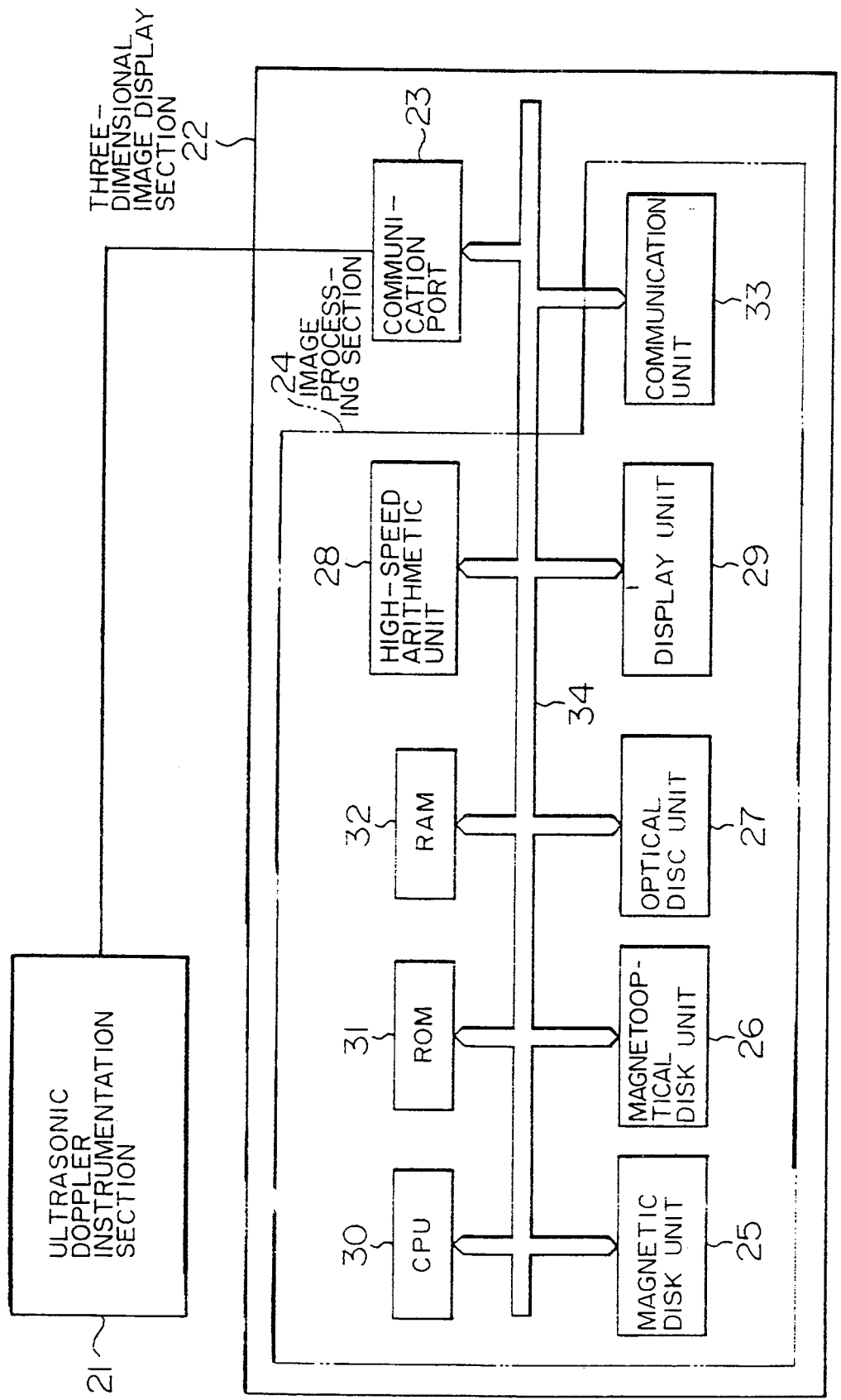
FIG. 1 is a block diagram showing an ultrasonic diagnosis apparatus according to an embodiment of the present invention.

FIG. 1 is a block diagram showing an ultrasonic diagnosis apparatus according to an embodiment of the present invention. This ultrasonic diagnosis apparatus obtains a plurality of Doppler image data corresponding to sliced planes different from one another of a diagnosis region of an object to be examined, respectively, and displays a three-dimensional image based on these plurality of Doppler image data, and is composed of an ultrasonic Doppler instrumentation section 21 and a three-dimensional image display section 22.

The ultrasonic Doppler instrumentation section 21 is for obtaining a plurality of Doppler image data corresponding to sliced planes different from one another (such as sliced planes at equal intervals) of a diagnosis region of an object to be examined, respectively. Although it is not illustrated, there are provided in the ultrasonic Doppler instrumentation section 21 a probe for transmitting and receiving an ultrasonic beam to the diagnosis region of the object to be examined, an ultrasonic transmit-receive section for controlling the drive of the probe so as to emit an ultrasonic beam and also amplifying a received signal of a reflected wave, a Doppler signal detecting section for detecting a reflected echo signal outputted from the ultrasonic transmit-receive section so as to obtain a Doppler signal, a blood flow information arithmetic section for receiving the Doppler signal outputted from the Doppler signal detecting section and computing blood flow information (blood flow direction, blood flow velocity and blood flow velocity variance) on the diagnosis region, and a hue information conversion section for converting the computed information into data for red color (R), data for green color (G) and data for blue color (B) in accordance with the contents of the blood flow information obtained in the blood flow information arithmetic section. The structures of these data for red color (R), data for green color (G) and data for blue color (B) are the same as the structures of data 5 for red color (R), data 6 for green color (G) and data 7 for blue color (B) shown in FIG. 8 described previously, respectively.

The ultrasonic Doppler instrumentation section 21 is also provided in a conventional ultrasonic diagnosis apparatus described previously, and is disclosed in, for example, "Real Time Two-Dimensional Doppler Echo Cardiography" pp. 6–13, edited and written by Ryozo Omoto, published on Dec. 9, 1983 by Diagnosis and Remedy Co., Ltd.

Further, the three-dimensional image display section 22 is composed of a communication port 23 for taking in a plurality of Doppler image data obtained by the ultrasonic Doppler instrumentation section 21 and an image processing section 24 for applying image processing to the taken-in plurality of Doppler image data. Further, the image processing section 24 is composed of storage units such as a magnetic disc unit 25, a magneto-optical disc unit 26 and an optical disc unit 27 for storing the inputted Doppler image data, a high-speed arithmetic unit 28 for reading data out of these storage units and performing three-dimensional image processing or the like, a display unit 29 such as a color CRT for displaying the Doppler image formed into a three-dimensional image by means of the high-speed arithmetic unit 28, a CPU 30, a ROM 31 and a RAM 32 for controlling the operation of respective components described above, a communication unit 33 for communicating with other external units, and a data bus 34 for transmitting data among those respective units described above.

Besides, the communication port 23 may take in the plurality of Doppler image data either in a form of a signal (such as an RGB signal+an NTSC signal) in which the data for red color (R), the data for green color (G) and the data for blue color (B) are mixed with one another or in a form of the data for red color (R), the data for green color (G) and the data for blue color (B) separated from one another.

An ultrasonic diagnosis apparatus is constructed of the ultrasonic Doppler instrumentation section 21 and the three-dimensional image display section 22 in the present embodiment, but it is also possible to reconstruct only the three-dimensional image display section 22 independently and connect this section 22 to an existing conventional ultrasonic diagnosis apparatus in application. In this case, the three-dimensional image display section 22 receives the plurality of Doppler image data from the existing conventional ultrasonic diagnosis apparatus.

Figure 3:
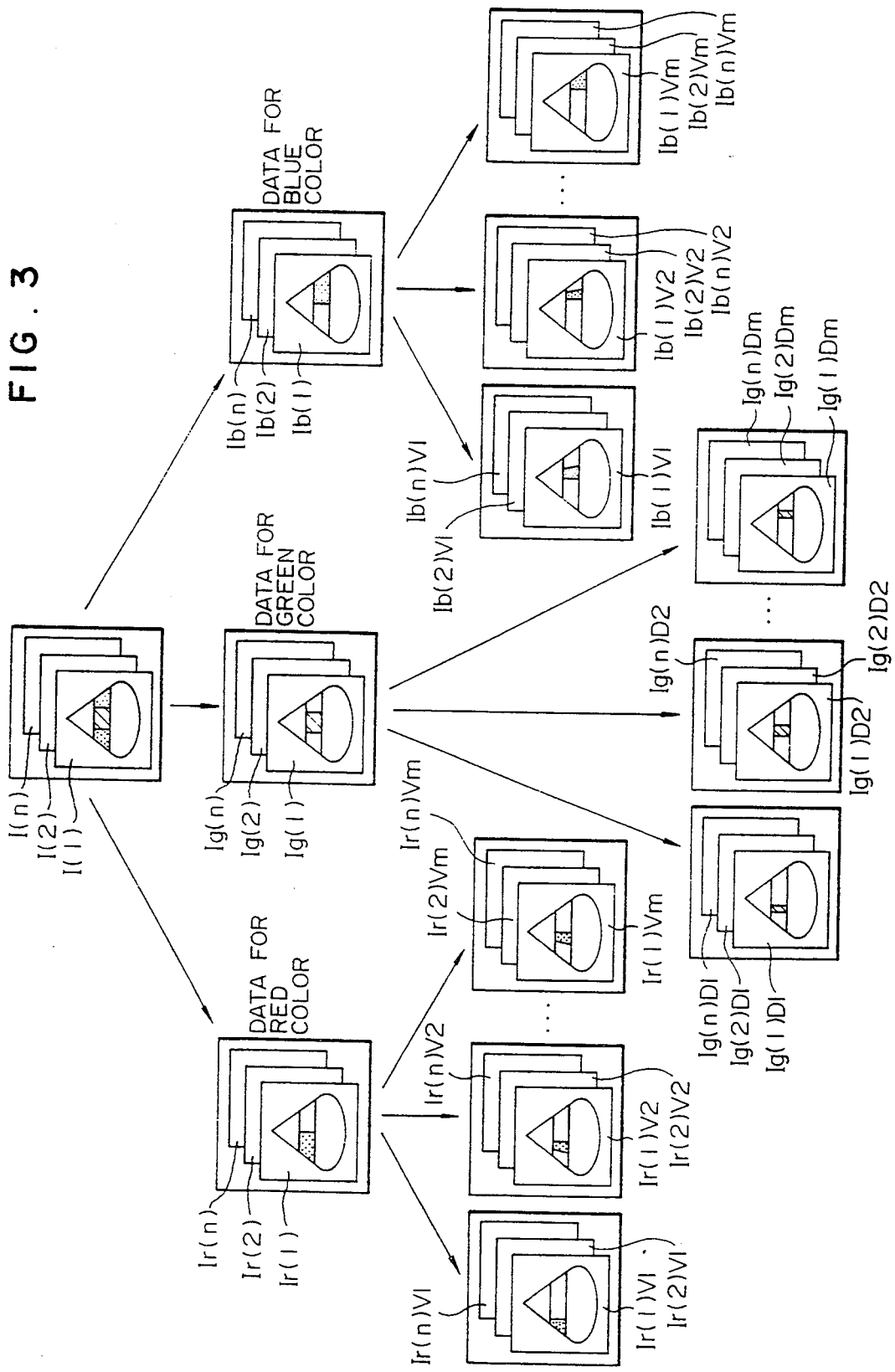
FIG. 3 is an explanatory diagram showing a process of data processing.
Figure 4:
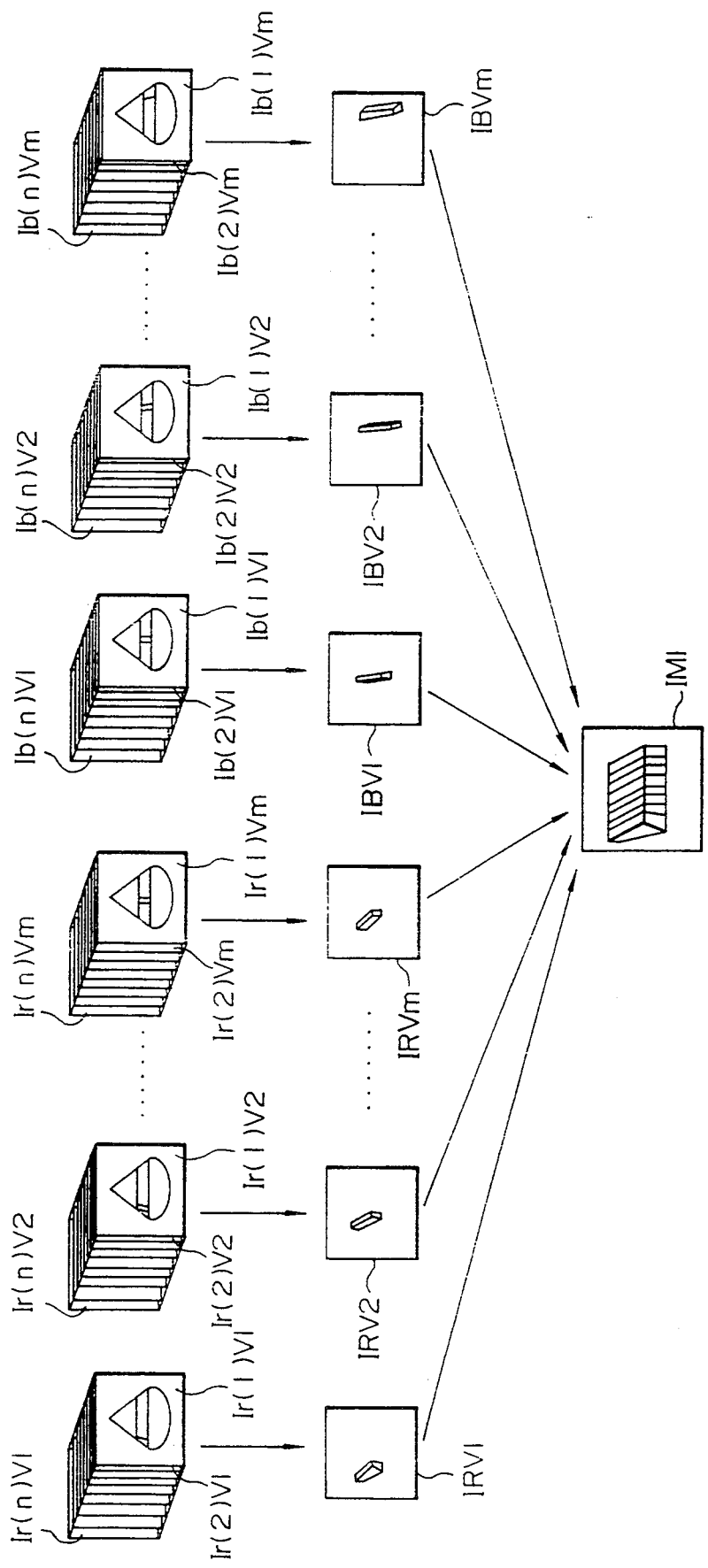
FIG. 4 is an explanatory diagram showing another process of data processing.

Next, an example of the operation of the ultrasonic diagnosis apparatus shown in FIG. 1, that is, the operation in the case that information on velocity of a blood flow or the like of an object to be examined is displayed as a three-dimensional image will be described with reference to FIG. 2 to FIG. 4.

Figure 2:
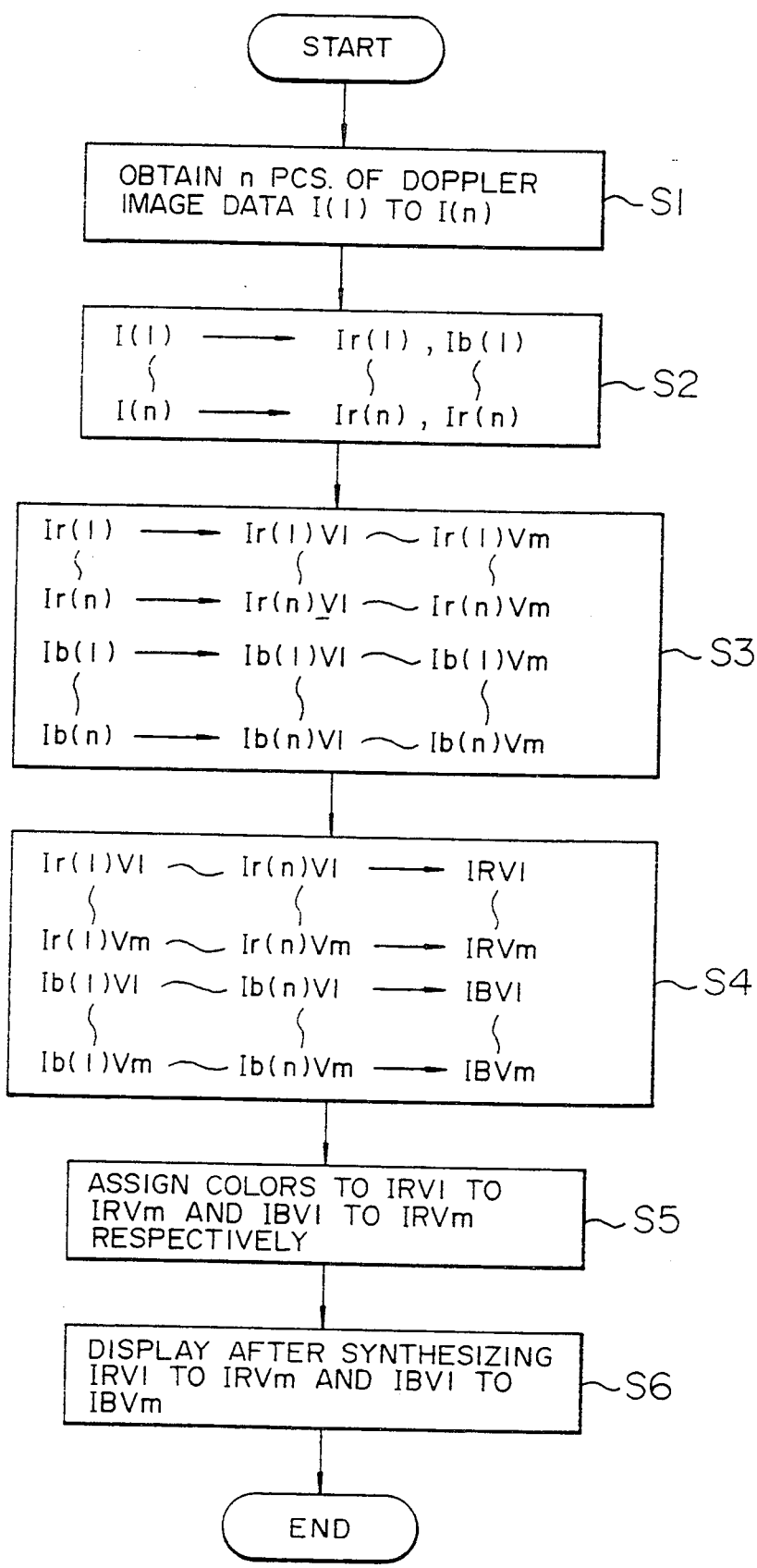
FIG. 2 is a flowchart showing an example of the operation of the ultrasonic diagnosis apparatus.

First, in a step S1 shown in FIG. 2, n pieces of Doppler image data I(1) to I(n) corresponding to n (n is an integer of 2 or more) pieces of sliced planes different from one another of a diagnosis region of an object to be examined are obtained by means of the ultrasonic Doppler instrumentation section 2. (See FIG. 3.) In the present embodiment, the Doppler image data I(1) to I(n) are signals obtained by mixing the data for red color (R), the data for green color (G) and the data for blue color (B) with one another, respectively.

Next, in a step S2 shown in FIG. 2, data Ir(1) to Ir(n) for red color (R) and data Ib(1) to Ib(n) for blue color (B) are separated from the Doppler image data I(1) to I(n). (See FIG. 3.) Namely, for example, the data Ir(1) for red color (R) and the data Ib(1) for blue color (B) are separated from the Doppler image data I(1) corresponding to a first sliced plane, the data Ir(2) for red color (R) and the data Ib(2) for blue color (B) are separated from the Doppler image data I(2) corresponding to a second sliced plane, and the data Ir(n) for red color (R) and the data Ib(n) for blue color (B) are separated from the Doppler image data I(n) corresponding to an nth sliced plane.

Figure 8:
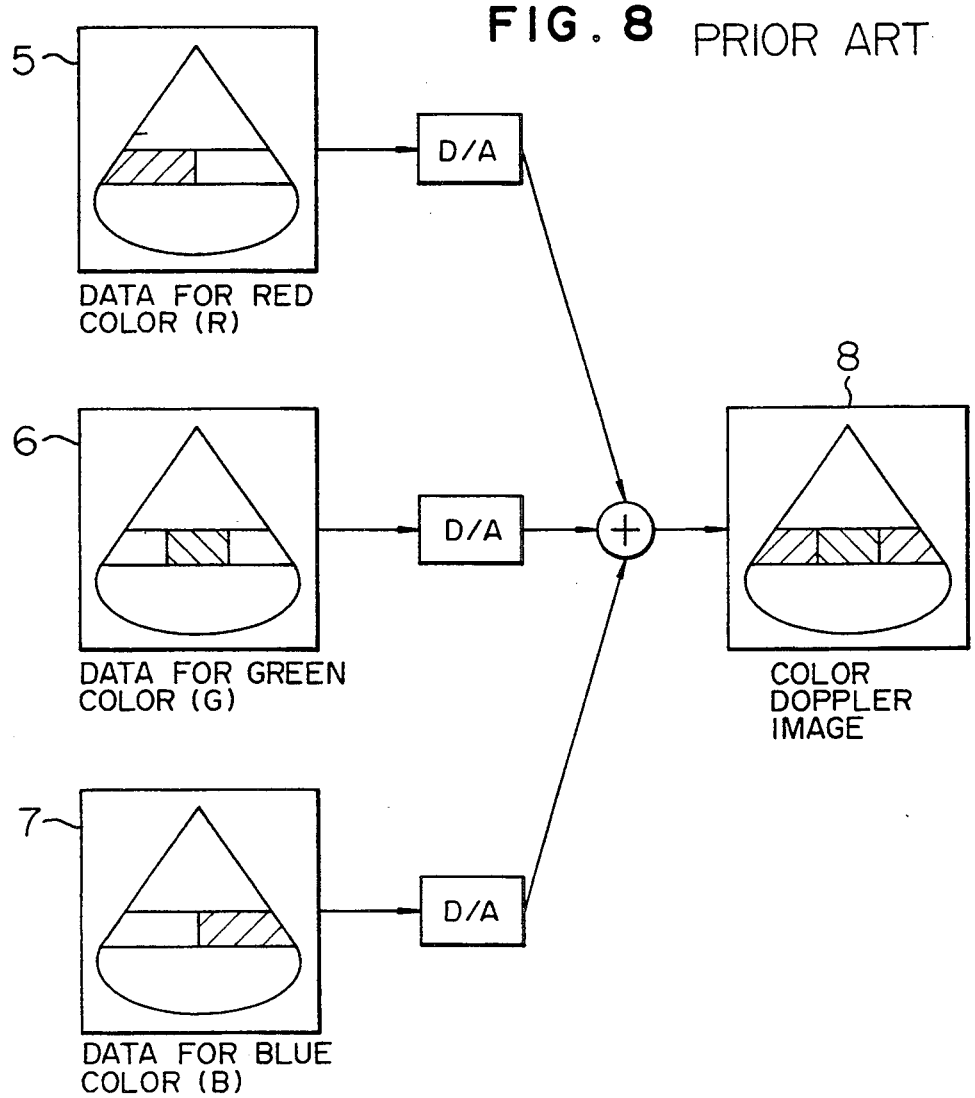
FIG. 8 is a diagram showing a structure of conventional color Doppler image data.
Figure 9:
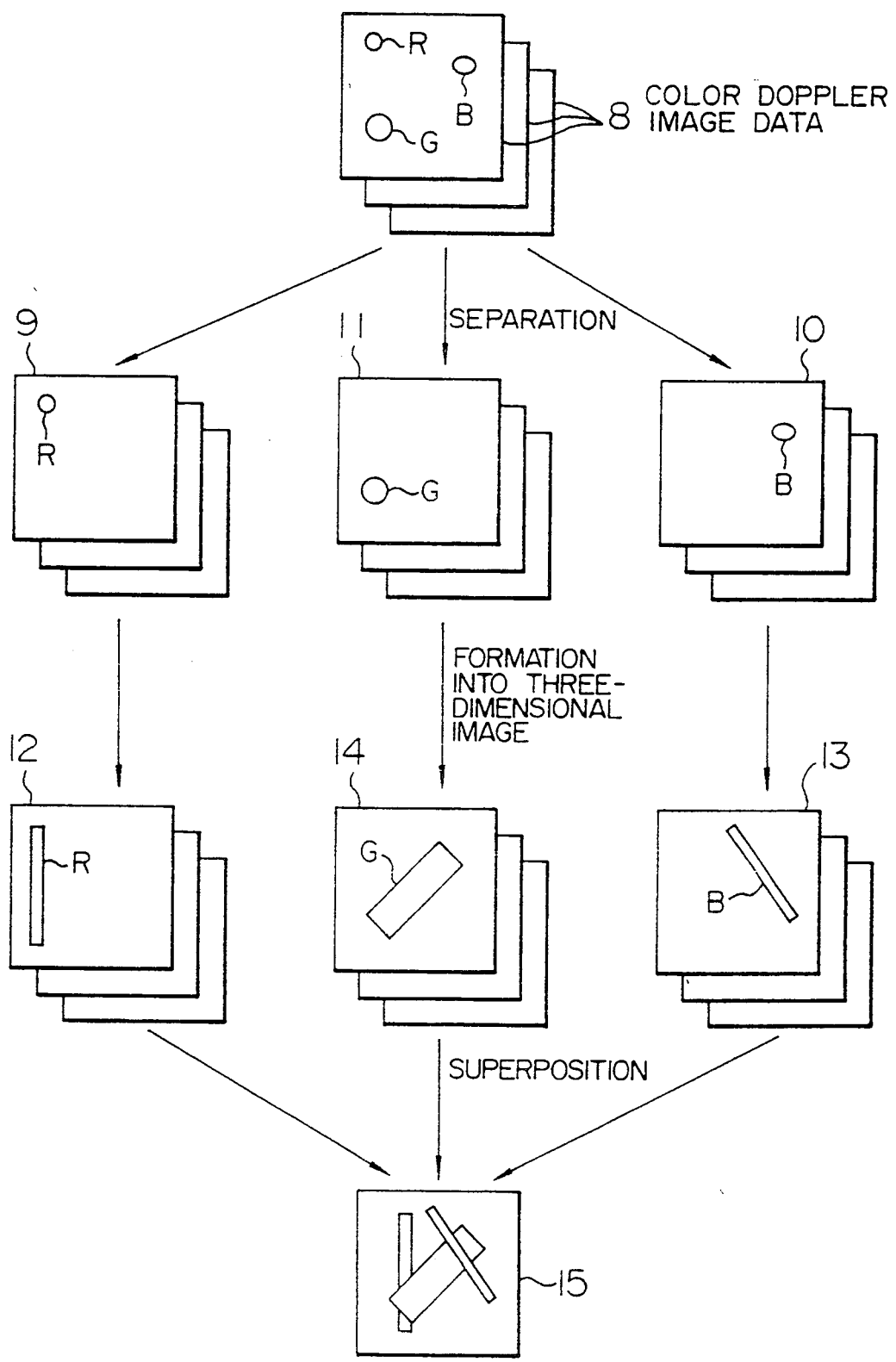
FIG. 9 is an explanatory diagram showing a conventional method for displaying a color three-dimensional image using Doppler image data.
Figure 10:
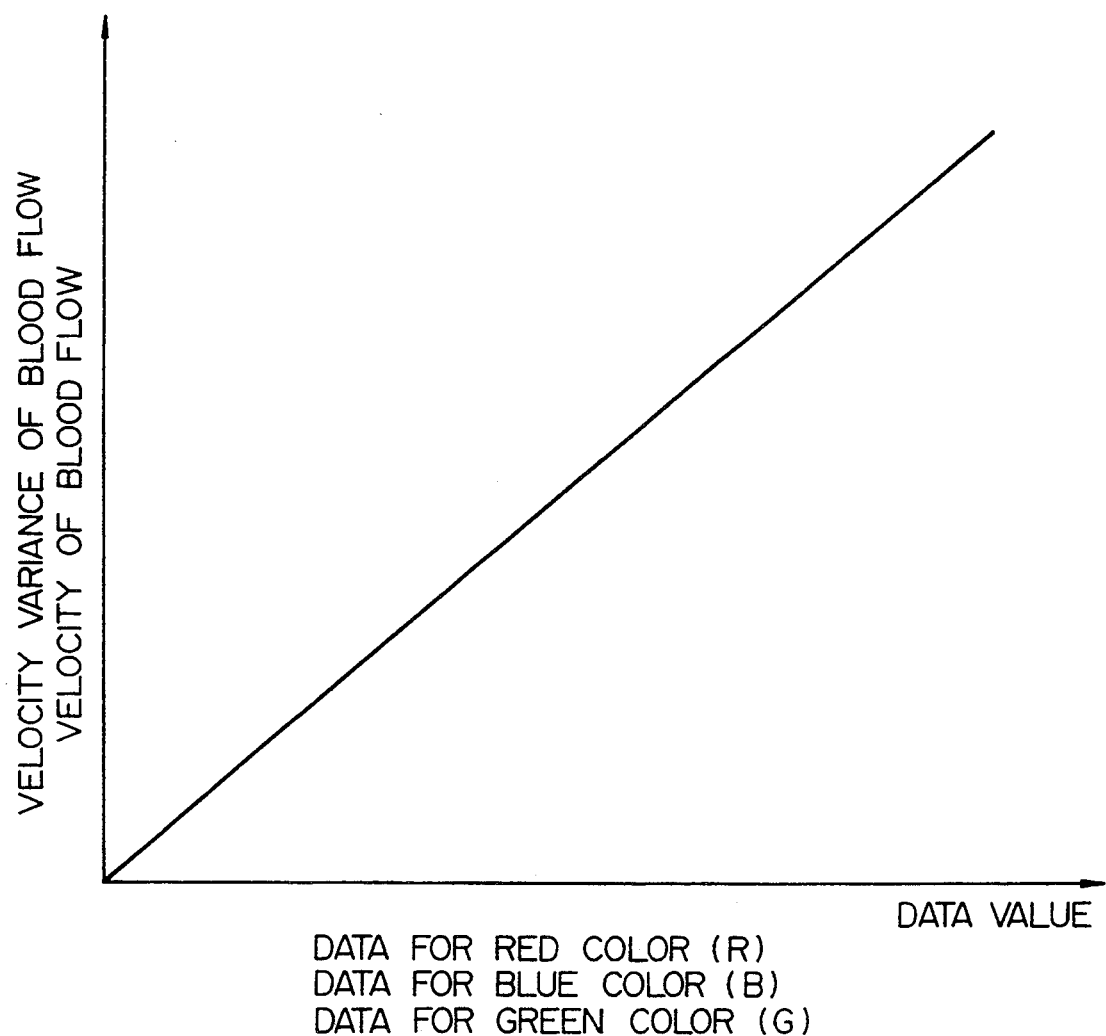
FIG. 10 is a diagram showing the relationship between data values of data for respective colors and blood flow velocity and blood flow velocity variance.

The structure of the data Ir(1) to Ir(n) for red color (R) are the same as the structure of the data 5 for red color (R) shown in FIG. 8 described previously, respectively, and the structures of the data Ib(1) to Ib(n) for blue color (B) are the same as the structure of the data 7 for blue color (B) shown in FIG. 8 described previously, respectively. Namely, for example, the data Ir(1) for red color (R) have respective data values corresponding to respective points on the first sliced plane, and show that, when a certain data value is zero, there is no blood flow in a first blood flow direction (a direction of coming on toward the ultrasonic beam) at a point corresponding to that data value, and that, when a certain data value is not zero, there is a blood flow in the first blood flow direction having a velocity in a magnitude corresponding to the magnitude of that data value at a point corresponding to that data value. (The bigger the data value is, the larger the velocity becomes.) In other words, the data It(1) for red color (R) show the distribution of the blood flow velocity in a first blood flow direction on the first sliced plane. Similarly, for example, the data Ib(n) for blue color (B) have respective data values corresponding to respective points of the nth sliced planes, and show that, when a certain data value is zero, there is no blood flow direction (a direction of getting away from the ultrasonic beam) at a point corresponding to that data value, and that, when a certain data value is not zero, there is a blood flow in the second blood flow direction having a velocity in a magnitude corresponding to the magnitude of that data value at a point corresponding to that data value. (The bigger the data value is, the larger the velocity becomes.) In other words, the data Ib(n) for blue color (B) show the distribution of the blood flow velocity in a second blood flow direction on an nth sliced plane.

Besides, when the data Ir(1) to Ir(n) for red color (R) and the data Ib(1) to Ib(n) for blue color (B) separated from one another are received from the ultrasonic Doppler instrumentation section 21 as the plurality of Doppler image data in the step S1, the step S2 is not required.

Next, in a step S3 shown in FIG. 2, the data Ir(1)V1 to Ir(1)Vm, Ir(2)V1 to Ir(2)Vm, . . . , Ir(n)V1 to Ir(n)Vm showing distributions of blood flow corresponding to each of a plurality of m (m is an integer of 2 or more) regions of the blood flow velocity are obtained from each of the separated data Ir(1) to Ir(n) for red color (R). (See FIG. 3.)

Namely, for example, the data Ir(1)V1 to Ir(1)Vm showing distributions of blood flow corresponding to respective velocity ranges V1 to Vm are obtained from the data Ir(1) for red color (R), the data Ir(2)V1 to Ir(2)Vm showing distributions of blood flow corresponding to each of the velocity ranges V1 to Vm are obtained from the data Ir(2) for red color (R), and the data Ir(n)V1 to Ir(n)Vm showing distributions of blood flow corresponding to respective velocity ranges. V1 to Vm are obtained from the data Ir(n) for red color (R).

The velocity range V1 shows a range expressed by $0<V1\leq v(1)$, the velocity range V2 shows a range expressed by $1<V2\leq v(2)$, and the velocity range Vm shows a range expressed by $v(m-1)<Vm\leq v(m)$ (where, v(1) to v(m) show a constant, respectively). To be concrete, for example, each of the velocity ranges V1 to Vm is set so as to become a range obtained by dividing the whole velocity range into m equal parts.

To be concrete, the data Ir(1)V1 is obtainable by, for example, deciding whether respective data values d in the data Ir(1) belong to a range corresponding to the velocity range V1 (a range expressed by $0<d\leq v'(1)$, where v'(1) is a data value corresponding to v(1)) or not. The data showing distribution of the points on the first sliced plane corresponding to the data value belonging to this range become the data Ir(2)V1.

As it is understood from the above description, each of the data Ir(1)V1 to Ir(1)Vm, Ir(2)V1 to Ir(2)Vm, . . . , Ir(n)V1 to Ir(n)Vm shows the data showing the distribution corresponding to each of the plurality of velocity ranges V1 to Vm among distributions of blood flow in the first blood flow direction on each sliced plane.

Further, in the step S3, the data Ib(1)V1 to Ib(1)Vm, Ib(2)V1 to Ib(2)Vm, . . . , Ib(n)V1 to Ib(n)Vm showing distributions of blood flow corresponding to each of a plurality of m (m is an integer of 2 or more) velocity ranges V1 to Vm are obtained from each of the separated data Ib(1) to Ib(n) for blue color (B). (See FIG. 3.)

Namely, for example, the data Ib(1)V1 to Ib(1)Vm showing distributions of the blood flow corresponding to respective velocity ranges V1 to Vm are obtained from the data Ib(1) for blue color (B), the data Ib(2)V1 to Ib(2)Vm showing distributions of the blood flow corresponding to respective velocity ranges V1 to Vm are obtained from the data Ib(2) for blue color (B), and the data Ib(n)V1 to Ib(n)Vm showing distributions of the blood flow corresponding to each of the velocity ranges V1 to Vm are obtained from the data Ib(n) for blue color (B).

To be concrete, for example, the data Ib(n)Vm can be obtained by deciding whether respective data values d in the data Ib(n) belong to the range corresponding to the velocity range Vm (a range expressed by $v'(m-1) < d \leq v'(m)$, where $v'(m-1)$ is a data value corresponding to $v(m-1)$ and $v'(m)$ is a data value corresponding to $v(m)$) or not. The data showing the distribution of the points on the nth sliced plane corresponding to a data value belonging to this area become the data Ib(n)Vm.

As it is realized from the above description, each of those data Ib(1)V1 to Ib(1)Vm, Ib(2)V1 to Ib(2)Vm, . . . , Ib(n)V1 to Ib(n)Vm shows data showing distributions corresponding to each of the plurality of velocity ranges V1 to Vm among distributions of the blood flowing in the second blood flow direction on respective sliced planes.

Next, in a step S4 shown in FIG. 2, respective three-dimensional image data IRV1 to IRVm are obtained based on the data Ir(1)V1 to Ir(n)V1, Ir(1)V2 to Ir(n)V2, . . . , Ir(1)Vm to Ir(n)Vm corresponding to each of the velocity ranges V1 to Vm and also corresponding to all of the sliced planes among all of the data Ir(1)V1 to Ir(n)Vm. (See FIG. 4.)

Namely, for example, the three-dimensional image data IRV1 are obtained from the data Ir(1)V1 to Ir(n)V1, the three-dimensional image data IRV2 are obtained from the data Ir(1)V2 to Ir(n)V2, and the three-dimensional image data IRVm are obtained from the data Ir(1)Vm to Ir(n)Vm. Description of a concrete method for obtaining such three-dimensional data IRV1 to IRVm is omitted since a method for obtaining three-dimensional image data from a plurality of two-dimensional distribution data is well known. (See U.S. Pat. No. 4,866,612 for instance.)

Further, in the step S4, respective three-dimensional image data IBV1 to IBVm are obtained based on the data Ib(1)V1 to Ib(n)V1, Ib(1)V2 to Ib(n)V2, . . . , Ib(1)Vm to Ib(n)Vm corresponding to each of the velocity ranges V1 to Vm and also corresponding to all of the sliced planes among all of the data Ib(1)V1 to Ib(1)Vm, Ib(2)V1 to Ib(2)Vm, . . . , Ib(n)V1 to Ib(n)Vm. (See FIG. 4.)

Namely, for example, the three-dimensional image data IBV1 are obtained from the data Ib(1)V1 to Ib(n)V1, the three-dimensional image data IBV2 are obtained from the data Ib(1)V2 to Ib(n)V2, and the three-dimensional image data IBVm are obtained from the data Ib(1)Vm to Ib(n)Vm.

Then, in a step S5 shown in FIG. 2, colors having tones of color different from one another are assigned to respective three-dimensional image data IRV1 to IRVm and IBV1 to IBVm.

Here, allocation of different colors described above is made by following techniques in regard to the data of R, G and B of each of the three-dimensional image data IRV1 to IRVm and IBV1 to IBVm. First, when a substance is displayed with a three-dimensional image, the depth thereof is expressed in general by light and shade of the image. Therefore, in case a substance is displayed in color with a three-dimensional image, it is required to define the color and light and shade thereof (brightness of color). Concerning the above, the display color of each picture element of a color Doppler image is determined by the data values of R, G and B. If the data values of R, G and B are determined simply, however, it happens sometimes that the tone of color and the brightness are not shown in an optimum manner in three-dimensional display. Thus, it is sufficient to determine data values of R, G and B by algorithm described below.

Namely, as stated in "Television Image information Engineering Handbook," pp. 18–28, edited by The Institute of Television Engineers of Japan and published by Ohm Company, signals in proportion to respective stimulus values of three primary colors R, G and B are obtained from an image pickup tube in a color television. At this time, R, G and B signals are transmitted after converting these signals into signals having compatibility with a black and white television in the NTSC system and other color television systems. For such a purpose, one of three signals R, G and B of color television signals is sent in a light and shade signal (a brightness signal) similarly to the black and white television signal, and new primary color signals expressing color information are transmitted with the remaining two signals. These new primary colors expressing colors are made to coincide with a wide band axis and a narrow band axis of visual sense characteristics with respect to a chromaticity spacial frequency, and the frequency bandwidth of a video signal with respect to the primary color is determined based on visual sense characteristics, thereby making it possible to transmit a color signal which is most efficient visually.

As a result, when a new primary color W having brightness information in place of R, G and B signals, a new primary color I as the wide band signal and a new primary color Q as a narrow band signal are used in the NTSC system, the relationship among general three primary colors R, G and B and new primary colors W, I and Q is expressed by following expressions (2).

$$W = 0.30R + 0.59G + 0.11B$$

$$I = 0.60R - 0.28G - 0.32B$$

$$Q = 0.21R - 0.52G + 0.31B \quad (2)$$

Further, when it is assumed that the minimum brightness value is "0", the maximum brightness value is $C_0$, a certain constant value with respect to a wide-band signal is $C_1$, and a certain constant value with respect to a narrow-band signal is $C_2$, it is sufficient to obtain R, G and B which meet the conditions of following expressions (3) in order to express an optional color and the brightness thereof.

$$0 < W < C_0$$
$$I_i = C_1$$
$$Q_i = C_2 \qquad (3)$$

Namely, it is sufficient to assign colors in the step S5 shown in FIG. 2 by obtaining through computation by the expressions (2) R, G and B in which I and Q are fixed and W is varied in the expressions (3) with respect to the three-dimensional image data IRV1 to IRVm and IBV1 to IBVm constituted by grouping at every velocity step. At this time, it is desirable to assign a color of red color system to the data IRV1 to IRVm and a color of blue color system to the data IBV1 to IBVm.

Next, in a step S6 shown in FIG. 2, final three-dimensional data IM1 is obtained by synthesizing the three-dimensional image data IRV1 to IRVm and IBV1 to IBVm assigned with the colors (FIG. 4), and a three-dimensional image corresponding to the three-dimensional image data IM1 is displayed by means of a display unit 29. Concrete description of such synthesization is omitted since it is apparent from U.S. Pat. No. 4,866,612 or the like. With this, information on the blood flow velocity is displayed on the three-dimensional image in different tones of color, and the depth direction (the direction distant from a visual point plane) in three-dimensional display is displayed with brightness.

Next, another example of the operation of the ultrasonic diagnosis apparatus shown in FIG. 1, i.e., the operation in case information on velocity variance of a blood flow or the like of an object to be examined is displayed as a three-dimensional image will be described with reference to FIG. 3, FIG. 5 and FIG. 6.

Figure 5:
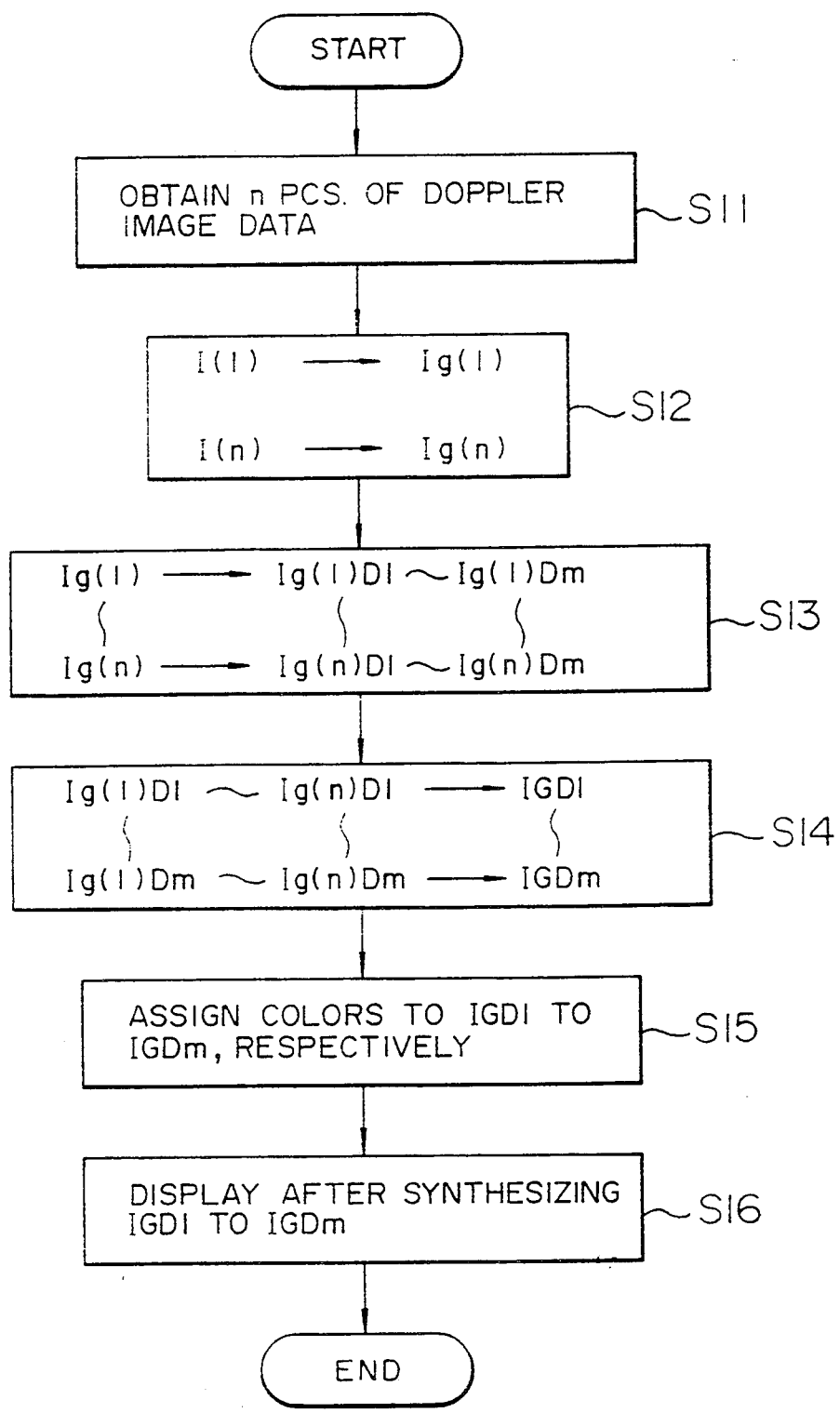
FIG. 5 is a flowchart showing another example of the operation of the ultrasonic diagnosis apparatus.
Figure 6:
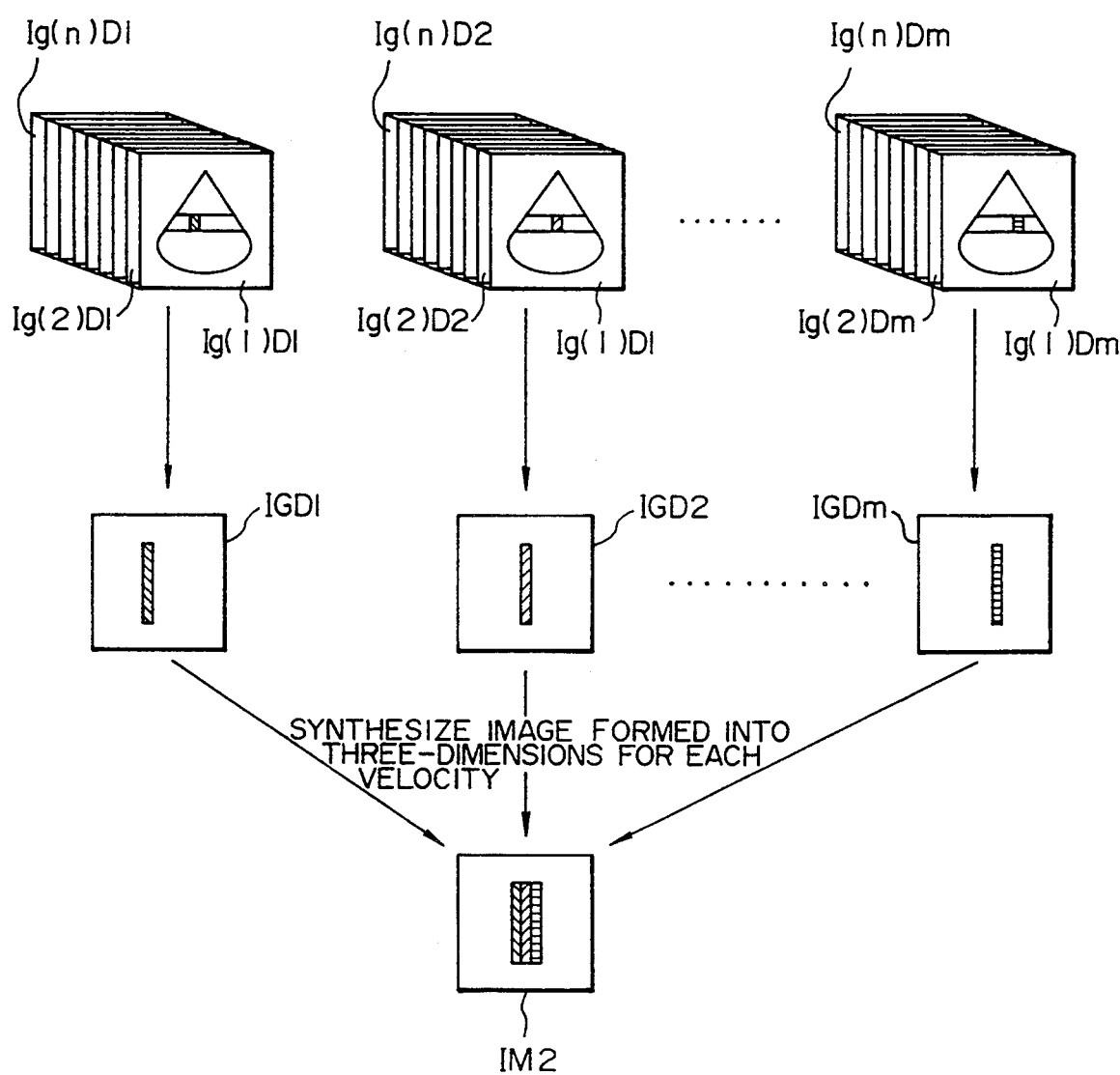
FIG. 6 is an explanatory diagram showing still another process of data processing.
Figure 7A:
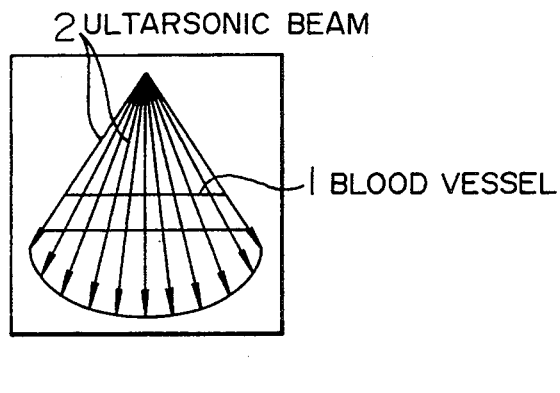
FIG. 7A shows an example of a state of radiating ultrasonic beams to a blood vessel at a diagnosis region.
Figure 7B:
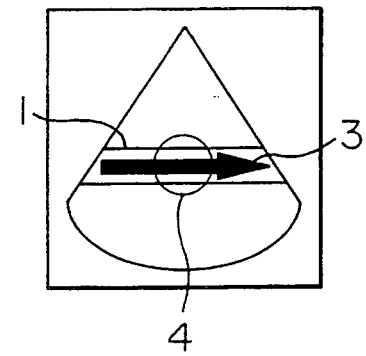
FIG. 7B shows an example of a state of a blood flow in the blood vessel.

First, in a step S11 shown in FIG. 5, n pieces of Doppler image data I(1) to I(n) corresponding to n (n is an integer of 2 or more) sliced planes different from one another of a diagnosis region of an object to be examined, respectively, are obtained by the ultrasonic Doppler instrumentation section 21. (See FIG. 3.)

Next, in a step S12 shown in FIG. 5, data Ig(1) to Ig(n) for green color (G) are separated from the Doppler image data I(1) to I(n). (See FIG. 3.) Namely, for example, the data Ig(1) for green color (G) are separated from the Doppler image data I(1) corresponding to the first sliced plane, the data Ig(2) for green color (G) are separated from the Doppler image data I(2) corresponding to the second sliced plane, and the data Ig(n) for green color (G) are separated from the Doppler image data I(n) corresponding to the nth sliced plane.

The structures of the data Ig(1) to Ig(n) for green color (G) are the same as the structure of the data 6 for green color (G) shown in FIG. 8 described previously. Namely, for example, the data Ig(1) for green color (G) have respective data values corresponding to respective points on the first sliced plane, and show that, when a certain data value is zero, there is no velocity variance of blood flow at a point corresponding to that data value, and that, when a certain data value is not zero, there is velocity variance having the magnitude corresponding to the magnitude of that data value in blood flow at a point corresponding to that data value. (The bigger the data value is, the larger the variance becomes.) In other words, the data Ig(1) for green color (G) shows the distribution of blood flow velocity variance on the first sliced plane.

Next, in a step S13 shown in FIG. 5, the data Ig(1)D1 to Ig(1)Dm, Ig(2)D1 to Ig(2)Dm, . . . , Ig(n)D1 to Ig(n)Dm showing distributions of blood flow corresponding to each of a plurality of m (m is an integer of 2 or more) variance ranges of the blood flow velocity variance are obtained from each of the separated data Ig(1) to Ig(n) for green color (G). (See FIG. 3.)

Namely, for example, the data Ig(1)D1 to Ig(1)Dm showing distributions of blood flow corresponding to each of variance ranges D1 to Dm are obtained from the data Ig(1) for green color (G), the data Ig(2)D1 to Ig(2)Dm showing distributions of blood flow corresponding to each of variance ranges D1 to Dm are obtained from the data Ig(2) for green color (G), and the data Ig(n)D1 to Ig(n)Dm showing distributions of blood flow corresponding to each of variance ranges D1 to Dm are obtained from the data Ig(n) for green color (G).

The variance ranges D1 shows a range expressed by $0 < D1 \leq d(1)$, the variance range D2 shows a range expressed by $1 < D2 \leq d(2)$, and the variance range Dm shows a range expressed by $d(m-1) < Dm \leq d(m)$ (d(1) to d(m) showing a constant, respectively). To be concrete, the variance ranges D1 to Dm are determined so as to be a range obtained by dividing the whole variance range into m sets of equal parts for instance.

To be concrete, the data Ig(1)D1 can be obtained by deciding whether respective data values d in the data Ig(1) belong to a range (a range expressed by $0 < d \leq d'(1)$, where (1) shows a data value corresponding to the variance range D1) corresponding to the variance range D1 or not. The data showing the distribution of the points corresponding to the data values belonging to this range on the first sliced plane become the data Ig(2)D1.

As it is realized from the above description, each of the data Ig(1)D1 to Ig(1)Dm, Ig(2)D1 to Ig(2)Dm, . . . , Ig(n)D1 to Ig(n)Dm shows the data showing the distribution of the velocity variance corresponding to each of the plurality of variance ranges D1 to Dm.

Next, in a step S14 shown in FIG. 5, respective three-dimensional image data IGD1 to IGDm are obtained based on the data Ig(1)D1 to Ig(n)D1, Ig(1)D2 to Ig(n)D2, . . . , Ig(1)Dm to Ig(n)Dm corresponding to each of the variance ranges D1 to Dm and also corresponding to all of the sliced planes among all of the data Ig(1)D1 to Ig(1)Dm, Ig(2)D1 to Ig(2)Dm, . . . , Ig(n)D1 to Ig(n)Dm. (See FIG. 6.)

Namely, for example, the three-dimensional image data IGD1 are obtained from the data Ig(1)D1 to Ig(n)D1, the three-dimensional image data IGD2 are obtained from the data Ig(1)D2 to Ig(n)D2, and the three-dimensional image data IGDm are obtained from the data Ig(1)Dm to Ig(n)Dm. The description of a concrete method for obtaining such three-dimensional image data IGD1 to IGDm is also omitted.

Next, in a step S15 shown in FIG. 5, colors having tones of color different from one another are assigned to each of the three-dimensional data IGD1 to IGDm. The assignment of colors is made in a similar manner as described previously.

Next, in a step S16 shown in FIG. 5, final three-dimensional image data IM2 are obtained by synthesizing the three-dimensional image data IGV1 to IGVm assigned with colors (See FIG. 6), and a three-dimensional image corresponding to the three-dimensional image data IM2 is displayed by means of a display unit 29. Concrete description of such synthesization is also omitted. With this, information on blood flow velocity variance is displayed in different tones of color on the three-dimensional image, and the depth (visual point, visual point plane, distance from light source or a light source plane) in three-dimensional display is displayed in brightness.

The embodiments of the present invention have been described above, but the present invention is not necessarily limited to respective embodiments described above.

For example, it may be arranged so that the data are synthesized by superposing the three-dimensional image data IM1 and the three-dimensional image data IM2 one upon another, and a three-dimensional image corresponding to the synthesized three-dimensional data is displayed. In this case, both the information on the blood flow velocity and the information on the blood flow velocity variance are displayed. Besides, in this case, assignment of colors described above is made so that the portion which is overlapped on the portion of blood flow velocity variance in the portion corresponding to the blood flow velocity and the portion which is not overlapped on the portion of blood flow velocity variance in the portion corresponding to the blood flow velocity show colors different from each other. Namely, the assignment of colors is made so that the respective three-dimensional image data IRV1 to IRVm and IBV1 to IBVm among the three-dimensional image data obtained by synthesizing the three-dimensional image data IM1 and the three-dimensional image data IM2 show tones of color different from one another, and the data corresponding to the respective three-dimensional image data IGD1 to IGDm among the three-dimensional image data obtained by synthesizing the three-dimensional image data IM1 and the three-dimensional image IM2 show tones of color different from one another.

As described above, according to the present invention, it is possible to display, without losing information on the blood flow velocity with respect to the blood flow or the like in an organism which originally belongs to a color Doppler image, the information in three-dimensional image display, too. Or, according to the present invention, it is also possible to display, without losing information on the blood flow velocity variance related to the blood flow or the like in an organism which originally belongs to a color Doppler image, that information in three-dimensional image display. Or, according to the present invention, it is also possible to display, without losing information on the blood flow velocity and information on the blood flow velocity variance related to the blood flow or the like in an organism which originally belongs to a color Doppler image, these information in three-dimensional image display.

We claim:

1. An apparatus for displaying a three-dimensional image based on a plurality of Doppler image data, comprising:

means for receiving said plurality of Doppler image data corresponding to a plurality of sliced planes of an object which are different from one another, respectively, said plurality of Doppler image data showing distributions of moving directions and moving velocities of a moving substance in said object on said plurality of sliced planes, respectively, and said moving directions including a first moving direction and a second moving direction;

means for obtaining each of first data showing distribution corresponding to each of a plurality of velocity ranges of said moving velocities among the distribution of the first moving direction of said moving substance on said each sliced plane based on each of Doppler image data;

means for obtaining each of second data showing distribution corresponding to each of said plurality of velocity ranges among the distribution of the second moving direction of said moving substance on said each sliced plane based on each of said Doppler image data;

means for obtaining each of first three-dimensional image data based on the data corresponding to each of said plurality of velocity ranges and also corresponding to all of said plurality of sliced planes among all of said first data;

means for obtaining each of second three-dimensional image data based on the data corresponding to each of said plurality of velocity ranges and also corresponding to all of said plurality of sliced planes among all of said second data;

means for obtaining third three-dimensional image data by synthesizing all of said first three-dimensional image data and all of said second three-dimensional image data with one another, the data corresponding to said respective first three-dimensional image data and said respective second three-dimensional image data among said third three-dimensional image data showing tones of color different from one another; and means for displaying said three-dimensional image corresponding to said third three-dimensional image data.

2. An apparatus for displaying a three-dimensional image according to claim 1, wherein data having different corresponding depths among said third three-dimensional image data show brightness different from one another.

3. An apparatus for displaying a three-dimensional image based on a plurality of Doppler image data, comprising:

means for receiving said plurality of Doppler image data corresponding to a plurality of sliced planes of an object which are different from one another, respectively, said plurality of Doppler image data showing distributions of moving velocity variances of a moving substance in said object on said plurality of sliced planes, respectively;

means for obtaining each of first data showing distribution corresponding to each of a plurality of variance ranges of said moving velocity variances based on each of said Doppler image data;

means for obtaining each of first three-dimensional image data based on the data corresponding to each of said plurality of variance ranges and also corresponding to all of said plurality of sliced planes among all of said first data;

means for obtaining second three-dimensional image data by synthesizing all of said first three-dimensional image data, the data corresponding to said respective first three-dimensional image data among said second three-dimensional image data showing tones of color different from one another; and means for displaying said three-dimensional image corresponding to said second three-dimensional image data.

4. An apparatus for displaying a three-dimensional image according to claim 3, wherein the data having different corresponding depths among said second three-dimensional image data show brightness different from one another.

5. An apparatus for displaying a three-dimensional image based on a plurality of Doppler image data, comprising:

means for receiving said plurality of Doppler image data corresponding to a plurality of sliced planes of an object which are different from one another, said plurality of Doppler image data showing distributions of moving directions, moving velocities and moving velocity variances of a moving substance in said object on said plurality of sliced planes, respectively, and said moving directions including a first moving direction and a second moving direction;

means for obtaining each of first data showing distribution corresponding to each of a plurality of velocity ranges of said moving velocities among the distribution of the first moving direction of said moving substance on said each sliced plane;

means for obtaining each of second data showing distribution corresponding to each of said plurality of velocity ranges among the distribution of the second moving direction of said moving substance on said each sliced plane based on each of said Doppler image data;

means for obtaining each of third data showing distribution corresponding to each of a plurality of variance ranges of said moving velocity variances based on each of said Doppler image data;

means for obtaining each of first three-dimensional image data based on the data corresponding to each of said plurality of velocity ranges and also corresponding to all of said plurality of sliced planes among all of said first data;

means for obtaining each of second three-dimensional image data based on the data corresponding to each of said plurality of velocity ranges and also corresponding to all of said plurality of sliced planes among all of said second data;

means for obtaining each of third three-dimensional image data based on the data corresponding to each of said plurality of variance ranges and also corresponding to all of said plurality of sliced planes among all of said third data;

means for obtaining fourth three-dimensional image data by synthesizing all of said first three-dimensional image data, all of said second three-dimensional image data and all of said third three-dimensional image data, the data corresponding to said respective first three-dimensional image data and said respective second three-dimensional image data among said fourth three-dimensional image data showing tones of color different from one another, and the data corresponding to said respective third three-dimensional image data among said fourth three-dimensional image data showing tones of color different from one another; and means for displaying said third three-dimensional image corresponding to said fourth three-dimensional image data.

6. An apparatus for displaying a three-dimensional image according to claim 5, wherein the data having different corresponding depths among said fourth three-dimensional image data show brightness different from one another.

7. A method for displaying a three-dimensional image based on a plurality of Doppler image data, comprising:

a step of receiving said plurality of Doppler image data corresponding to a plurality of sliced planes of an object which are different from one another, respectively, said plurality of Doppler image data showing distributions of moving directions and moving velocities of a moving substance in said object on said plurality of sliced planes, respectively, and said moving directions including a first moving direction and a second moving direction;

a step of obtaining each of first data showing distribution corresponding to each of a plurality of velocity ranges of said moving velocities among the distribution of the first moving direction of said moving substance on said each sliced plane based on each of Doppler image data;

a step of obtaining each of second data showing the distribution corresponding to each of said plurality of velocity ranges among the distribution of the second moving direction of said moving substance on said each sliced plane based on each of said Doppler image data;

a step of obtaining each of first three-dimensional image data based on the data corresponding to each of said plurality of velocity ranges and also corresponding to all of said plurality of sliced planes among all of said first data;

a step of obtaining each of second three-dimensional image data based on the data corresponding to each of said plurality of velocity ranges and also corresponding to all of said plurality of sliced planes among all of said second data;

a step of obtaining third three-dimensional image data by synthesizing all of said first three-dimensional image data and all of said second three-dimensional image data with one another, the data corresponding to said respective first three-dimensional image data and said respective second three-dimensional image data among said third three-dimensional image data showing tones of color different from one another; and a step of displaying said three-dimensional image corresponding to said third three-dimensional image data.

8. A method for displaying a three-dimensional image according to claim 7, wherein the data having different corresponding depths among said third three-dimensional image data show brightness different from one another.

9. A method for displaying a three-dimensional image based on a plurality of Doppler image data, comprising:

a step of receiving said plurality of Doppler image data corresponding to a plurality of sliced planes of an object which are different from one another, respectively, said plurality of Doppler image data showing distributions of moving velocity variances of a moving substance in said object on said plurality of sliced planes, respectively;

a step of obtaining each of first data showing distribution corresponding to each of a plurality of variance ranges of said moving velocity variances based on each of said Doppler image data;

a step of obtaining each of first three-dimensional image data based on the data corresponding to each of said plurality of variance ranges and also corresponding to all of said plurality of sliced planes among all of said first data;

a step of obtaining second three-dimensional image data by synthesizing all of said first three-dimensional image data, the data corresponding to said respective first three-dimensional image data among said second three-dimensional image data showing tones of color different from one another; and a step of displaying said three-dimensional image corresponding to said second three-dimensional image data.

10. A method for displaying a three-dimensional image according to claim 9, wherein the data having different corresponding depths among said second three-dimensional image data show brightness different from one another.

11. A method for displaying a three-dimensional image based on a plurality of Doppler image data, comprising:

a step of receiving said plurality of Doppler image data corresponding to a plurality of sliced planes of an object which are different from one another, said plurality of Doppler image data showing distributions of moving directions, moving velocities and moving velocity variances of a moving substance in said object on said plurality of sliced planes, respectively, and said moving directions including a first moving direction and a second moving direction;

a step of obtaining each of first data showing distribution corresponding to each of a plurality of velocity ranges of said moving velocities among the distribution of the first moving direction of said moving substance on said each sliced plane;

a step of obtaining each of second data showing distribution corresponding to each of said plurality of velocity ranges among the distribution of the second moving direction of said moving substance on said each sliced plane based on each of said Doppler image data;

a step of obtaining each of third data showing distribution corresponding to each of a plurality of variance ranges of said moving velocity variances based on each of said Doppler image data;

a step of obtaining each of first three-dimensional image data based on the data corresponding to each of said plurality of velocity ranges and also corresponding to all of said plurality of sliced planes among all of said first data;

a step of obtaining each of second three-dimensional image data based on the data corresponding to each of said plurality of velocity ranges and also corresponding to all of said plurality of sliced planes among all of said second data;

a step of obtaining each of third three-dimensional image data based on the data corresponding to each of said plurality of variance ranges and also corresponding to all of said plurality of sliced planes among all of said third data;

a step of obtaining fourth three-dimensional image data by synthesizing all of said first three-dimensional image data, all of said second three-dimensional image data and all of said third three-dimensional image data, the data corresponding to said respective first three-dimensional image data and said respective second three-dimensional image data among said fourth three-dimensional image data showing tones of color different from one another, and the data corresponding to said respective third three-dimensional image data among said fourth three-dimensional image data showing tones of color different from one another: and a step of displaying said third three-dimensional image corresponding to said fourth three dimensional image data.

12. A method for displaying a three-dimensional image according to claim 11, wherein the data having different corresponding depths among said fourth three-dimensional image data show brightness different from one another.

13. An ultrasonic diagnosis apparatus for displaying a three-dimensional image based on a plurality of Doppler image data, comprising:

means for obtaining said plurality of Doppler image data corresponding to a plurality of sliced planes of an object which are different from one another, respectively, said plurality of Doppler image data showing distribution of moving directions and moving velocities of a moving substance in said object on said plurality of sliced planes, respectively, and said moving directions including a first moving direction and a second moving direction;

means for obtaining each of first data showing distribution corresponding to each of a plurality of velocity ranges of said moving velocities among distribution of the first moving direction of said moving substance on each sliced plane based on each of said Doppler image data;

means for obtaining each of second data showing distribution corresponding to each of said plurality of velocity ranges among distribution of the second moving direction of said moving substance based on each of said Doppler image data;

means for the obtaining each of first three-dimensional image data based on the data corresponding to each of said plurality of velocity ranges and also corresponding to all of said plurality of sliced planes among all of said first data;

means for obtaining each of second three-dimensional image data based on the data corresponding to each of said plurality of velocity ranges and also corresponding to all of said plurality of sliced planes among all of said second data;

means for obtaining third three-dimensional image data by synthesizing all of said first three-dimensional image data and all of said second three-dimensional image data, the data corresponding to said respective first three-dimensional image data and said respective second three-dimensional image data among said third three-dimensional image data showing tones of color different from one another; and means for displaying said three-dimensional image corresponding to said third three-dimensional image data.

14. An ultrasonic diagnosis apparatus according to claim 13, wherein the data having different corresponding depths among said third three-dimensional image data show brightness different from one another.

15. An ultrasonic diagnosis apparatus for displaying a three-dimensional image based on a plurality of Doppler image data, comprising:

means for obtaining said plurality of Doppler image data corresponding to a plurality of sliced planes of an object which are different from one another, respectively, said plurality of Doppler image data showing distributions of moving velocity variances of a moving substance in said object on said plurality of sliced planes, respectively;

means for obtaining each of first data showing the distribution corresponding to each of a plurality of variance ranges of said moving velocity variances based on each of said Doppler image data;

means for obtaining each of first three-dimensional image data based on the data corresponding to each of said plurality of variance ranges and also corresponding to all of said plurality of sliced planes among all of said first data;

means for obtaining second three-dimensional image data by synthesizing all of said first three-dimensional image data, the data corresponding to said respective first three-dimensional image data among said second three-dimensional image data showing tones of color different from one another; and means for displaying said three-dimensional image corresponding to said second three-dimensional image data.

16. An ultrasonic diagnosis apparatus according to claim 15, wherein the data having different corresponding depths among said second three-dimensional image data show brightness different from one another.

17. An ultrasonic diagnosis apparatus for displaying a three-dimensional image based on a plurality of Doppler image data, comprising:

means for obtaining said plurality of Doppler image data corresponding to a plurality of sliced planes of an object which are different from one another, said plurality of Doppler image data showing distribution of moving directions, moving velocities and moving velocity variances of a moving substance in said object on said plurality of sliced planes, respectively, and said moving directions including a first moving direction and a second moving direction;

means for obtaining each of first data showing the distribution corresponding to each of a plurality of velocity ranges of said moving velocities among the distribution of the first moving direction of said moving substance on said each sliced plane;

means for obtaining each of second data showing distribution corresponding to each of said plurality of velocity ranges among the distribution of the second moving direction of said moving substance on said each sliced plane based on each of said Doppler image data;

means for obtaining each of third data showing distribution corresponding to each of a plurality of variance ranges of said moving velocity variances based on each of said Doppler image data;

means for obtaining each of first three-dimensional image data based on the data corresponding to each of said plurality of velocity ranges and also corresponding to all of said plurality of sliced planes among all of said first data;

means for obtaining each of second three-dimensional image data based on the data corresponding to each of said plurality of velocity ranges and also corresponding to all of said plurality of sliced planes among all of said second data;

means for obtaining each of third three-dimensional image data based on the data corresponding to each of said plurality of variance ranges and also corresponding to all of said plurality of sliced planes among all of said third data;

means for obtaining fourth three-dimensional image data by synthesizing all of said first three-dimensional image data, all of said second three-dimensional image data and all of said third three-dimensional image data, the data corresponding to said respective first three-dimensional image data and said respective second three-dimensional image data among said fourth three-dimensional image data showing tones of color different from one another and the data corresponding to said respective third three-dimensional image data among said fourth three-dimensional image data showing tones of color different from one another; and means for displaying said third three-dimensional image corresponding to said fourth three-dimensional image data.

18. An ultrasonic diagnosis apparatus according to claim 17, wherein the data having different corresponding depths among said fourth three-dimensional image data show brightness different from one another.

* * * * *